(12) United States Patent
Vauclair

(10) Patent No.: US 7,688,982 B2
(45) Date of Patent: Mar. 30, 2010

(54) PROTECTED RETURN PATH FROM DIGITAL RIGHTS MANAGEMENT DONGLE

(75) Inventor: Marc Vauclair, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 855 days.

(21) Appl. No.: 10/548,744

(22) PCT Filed: Mar. 12, 2004

(86) PCT No.: PCT/IB2004/050242

§ 371 (c)(1),
(2), (4) Date: Sep. 9, 2005

(87) PCT Pub. No.: WO2004/082201

PCT Pub. Date: Sep. 23, 2004

(65) Prior Publication Data

US 2006/0236131 A1    Oct. 19, 2006

(30) Foreign Application Priority Data

Mar. 14, 2003 (EP) .................. 03100658

(51) Int. Cl.
*H04L 9/00* (2006.01)
*H04L 9/08* (2006.01)
*H04N 7/167* (2006.01)
*G06F 11/30* (2006.01)

(52) U.S. Cl. .................. 380/284; 380/45; 380/201; 380/210; 713/188; 713/194

(58) Field of Classification Search .................. 380/284
See application file for complete search history.

(56) References Cited

U.S. PATENT DOCUMENTS 4,926,480 A    5/1990    Chaum (Continued)

FOREIGN PATENT DOCUMENTS

EP    1176827 A2    1/2002

(Continued)

OTHER PUBLICATIONS

Written Opinion of the International Searching Authority PCT/IB2004/050242.

*Primary Examiner*—Kaveh Abrishamkar

(57) ABSTRACT

A method, apparatus, and system for providing secure communication between a tamper resistant device (404) and a sink device (406) is disclosed. Encrypted content is received from a source device (402) at the tamper resistant device (404), wherein the content has been encrypted using a first key. The content is decrypted using the decrypted first key. A second key is received at the tamper resistant device (404) from the sink device (406), wherein the second key is encrypted using the public key of the tamper resistant device (404). The second key is decrypted using the private key of the tamper resistant device (404). The content is re-encrypted using the second key. The re-encrypted content is transmitted to the sink device (406).

18 Claims, 3 Drawing Sheets

U.S. PATENT DOCUMENTS

| | | |
|---|---|---|
| 5,202,922 A | 4/1993 | Iijima |
| 5,218,638 A | 6/1993 | Matsumoto et al. |
| 5,341,425 A * | 8/1994 | Wasilewski et al. ......... 380/212 |
| 5,602,918 A | 2/1997 | Chen et al. |
| 6,782,477 B2 * | 8/2004 | McCarroll ................... 713/189 |
| 6,853,728 B1 * | 2/2005 | Kahn et al. .................. 380/239 |
| 7,120,249 B2 * | 10/2006 | Roberts ....................... 380/44 |
| 2002/0034302 A1 | 3/2002 | Moriai et al. |
| 2002/0161997 A1 * | 10/2002 | Yamasaki et al. ............ 713/150 |
| 2003/0021420 A1 * | 1/2003 | Kamperman et al. ......... 380/277 |

FOREIGN PATENT DOCUMENTS

| | | |
|---|---|---|
| WO | 0062290 A1 | 10/2000 |
| WO | 0105150 A1 | 1/2001 |

* cited by examiner

PROTECTED RETURN PATH FROM DIGITAL RIGHTS MANAGEMENT DONGLE

The invention relates to securing the transmission of data, and more particularly to a method, apparatus, and system for securing the transmission of data between a tamper resistant device and a sink device.

The explosion in the use of computers and networks such as the Internet has lead to problems with respect to the protection of intellectual property rights to data and information transmitted over the Internet. These problems are a result of the ease at which digital information can be transmitted and copied. In digital form, information such as video, music, games, software, etc., can be copied with such high quality that it can be hard to distinguish between the original and copied versions of the information. As a result, information in digital form is a very tempting target for hackers.

In order to combat the illegal copying of digital information, various forms of protection have been developed. For example, when a source device sends digital multimedia content to a sink device, the content can be encrypted in some manner before the content is transmitted from the source device to the sink device so as to protect the digital content from being stolen or improperly copied. As illustrated in FIG. 1, the multimedia content 106 is transmitted from the source device 102 to the sink device 104 for display. The multimedia content 106 is first encoded by an encoder 108. The encoded content is then encrypted by an encryption device 110 using an encryption key. The encrypted data is then transmitted to the sink device. The sink device 104 uses the encryption key to decrypt the encrypted content using the decryption device 114. The decrypted content is then decoded by a decoder 116. The decoded content is then rendered by a rendering device 120 and displayed on an output device 122. One problem with this solution is that the sink device needs to know the encryption key before the encrypted content can be decrypted. Thus, a distributor of content would have to make sure that each legitimate customer has the encryption key. This could be a logistical problem for large distributors of content. Furthermore, an attacker would have many sources to target in an attempt to discover the encryption key.

One system that has been developed to combat this problem is the use of asymmetric keys. The source device 102 and the sink device 104 can each have asymmetric keys which comprise a public and private key. Information encrypted with a public key can only be decrypted by the private key and vice versa.

The encryption of the content on the vulnerable link between the source device 102 and the sink device 104 prevents unwanted digital copying of the content However, an attacker can still try and hack the sink device 104 to obtain the decryption key and thereby gain access to the content. To combat such attacks, the decryption of the content can be performed by a tamper resistant device such as a smart card or dongle which is either attached to or part of the sink device 104 as illustrated in FIG. 2. In this scenario, the content is encrypted using an encryption key and the encryption key itself is encrypted using the public key of the tamper resistant device. When the tamper resistant device receives the encrypted content and key, the encrypted encryption key is decrypted using the private key of the tamper resistant device. The private key is stored securely inside the tamper resistant device 201, so that the attacker can not gain access to the private key. The received encrypted content is decrypted by the decryption device 203 using the stored decrypted encryption key. The decrypted content is sent to the decoder 116 and is processed as described above with reference to FIG. 1. One disadvantage of this system is that the content is sent in an unprotected format from the tamper resistant device to the sink device 104. As a result, an unauthorized digital copy of the content can still be obtained by interposing a sniffer device between the sink device 104 and the tamper resistant device 201. As a result, there is a need for a method and system for protecting the link between the sink device and the tamper resistant device.

It is an object of the invention to overcome the above-described deficiency by encrypting the content sent between the tamper resistant device and the sink device.

According to one embodiment of the invention, a method, apparatus, and system for providing secure communication between a tamper resistant device and a sink device is disclosed. Encrypted content is received from a source device at the tamper resistant device, wherein the content has been encrypted using a first key. The content is decrypted using the decrypted first key. A second key is received at the tamper resistant device from the sink device, wherein the second key is encrypted using the public key of the tamper resistant device. The second key is decrypted using the private key of the tamper resistant device. The content is re-encrypted using the second key. The re-encrypted content is transmitted to the sink device.

These and other aspects of the invention will be apparent from and elucidated with reference to the embodiments described hereafter.

The invention will now be described, by way of example, with reference to the accompanying drawings, wherein.

According to one embodiment of the invention, a source device, a tamper resistant device and a sink device are each assigned an asymmetric public-private key pair that can be used to authenticate each device to the other devices and the key pairs are also used to perform protected information exchanges between the various devices. Unlike the known systems described above, the present invention uses the public-private key pairs to encrypt the encryption keys used to encrypt the content on both the link between the source device and the tamper resistant device and the link between the tamper resistant device and the sink device. Briefly, the first encryption key which is used by the source device to encrypt the content is sent by the source device to the tamper resistant device encrypted with the public key of the tamper resistant device (the encrypted key transparently transmits through the sink device). This key is permanent and is attached to the content. The sink device does not know the key. In addition, a second encryption key which is used by the tamper resistant device to encrypt the content sent between the tamper resistant device and the sink device is itself encrypted using the public key of the tamper resistant device and is sent from the sink device to the tamper resistant device. In the alternative, a scrambling key instead of the second encryption key can be sent to the tamper resistant device from the sink device as will be described below in more detail.

Figure 1:
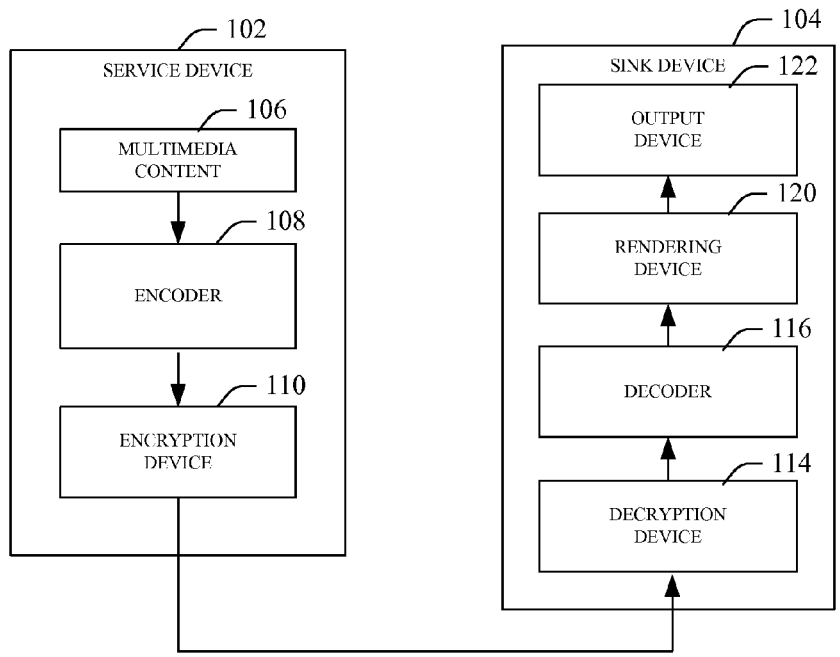
FIG. 1 is a block schematic representation of a known transmission system for transmitting media content.
Figure 2:
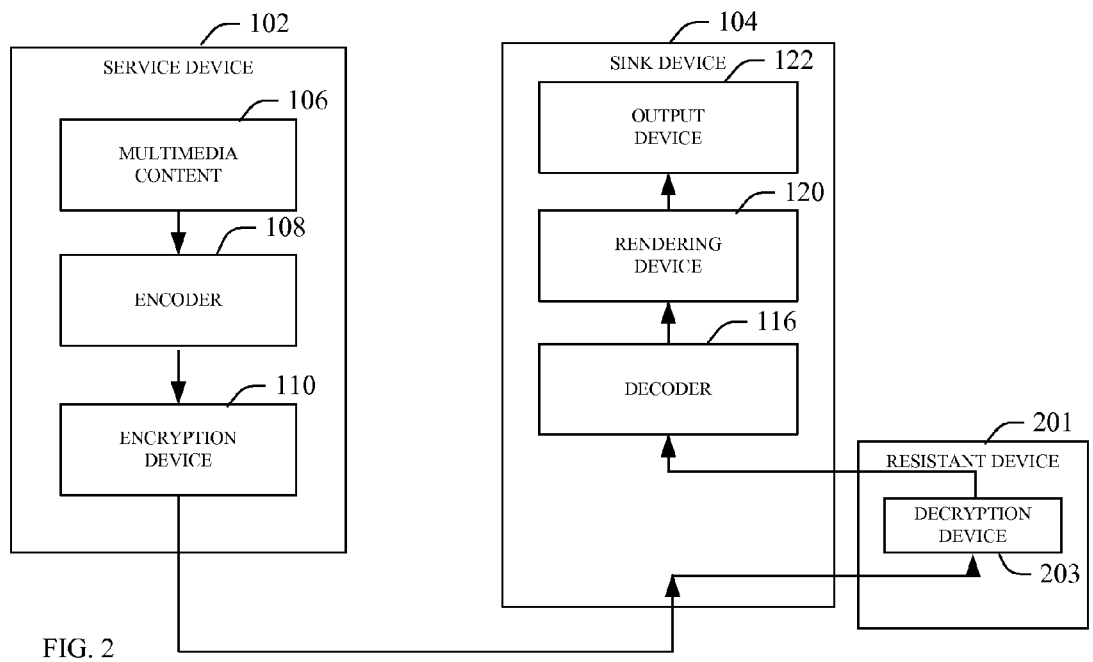
FIG. 2 is a block schematic representation of a known transmission system for transmitting media content.
Figure 3:
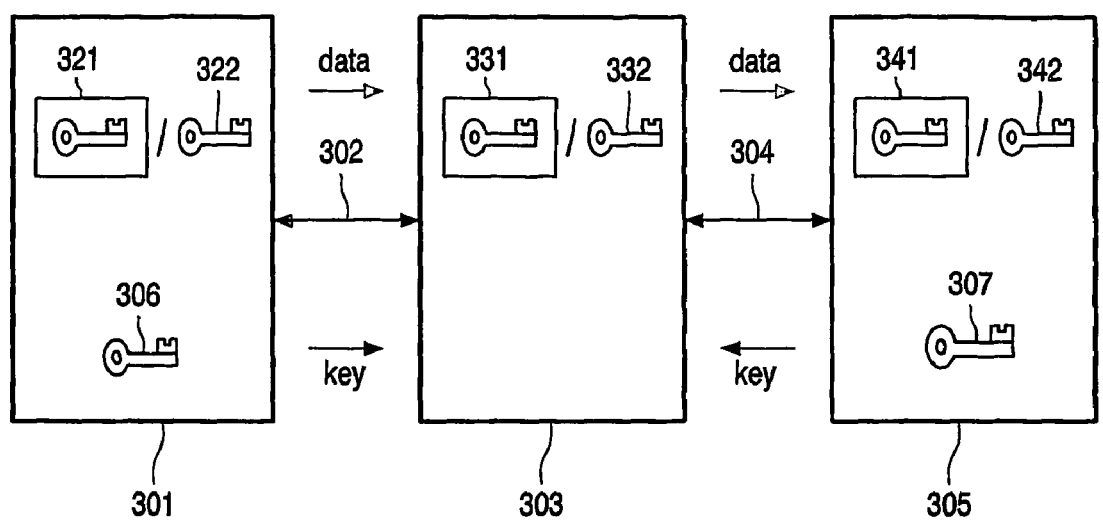
FIG. 3 illustrates the data and encrypted key flow between a source device, a tamper resistant device and a sink device according to one embodiment of the invention.

The flow of data and encryption keys which was briefly described above will now be explained in more detail with reference to FIG. 3. As shown, a source device 301 is connected to a tamper resistant device 303 via a transmission link 302 and the tamper resistant device 303 is connected to a sink device 305 via a transmission link 304. It will be understood by those skilled in the art that the transmission links can be any kind of communication link, both wireless or wired, which is capable of transmitting digital information. The source device 301 has a public key 1 322 and a private key 1 321. The tamper resistant device 303 has a public key 2 332 and a private key 2 331. The sink device 305 has a public key 3 342 and a private key 3 341. The devices use the public and private keys 322, 321, 332, 331, 342, 341 in a known manner to authenticate themselves to one another. While the devices illustrated in FIG. 3 each have a public/private key pair, it will be understood by one skilled in the art that all of the devices, e.g., the sink device, do not need a public/private key pail to practice the invention.

As will be explained in more detail below, the source device 301 encrypts the multimedia content using a first encryption key 306 and transmits the encrypted content to the tamper resistant device 303 via the transmission link 302. In addition, the source device 301 encrypts the encryption key 306 using the public key 2 of the tamper resistant device 303 and transmits the encrypted encryption key to the tamper resistant device 303 via the transmission link 302. Briefly, the tamper resistant device 303 then decrypts the encrypted encryption key 306 using the private key 2. The tamper resistant device 303 then decrypts the encrypted content using the decrypted encryption key 306. In the alternative, the source device 301 and the tamper resistant device 303 can exchange key material during the authentication phase of the protocol. The key material exchanged on both sides of the link is then grouped and used in a mathematical process to produce a key generator that delivers the same key on both sides of the link or the same stream of keys if the encryption key is to be updated, modified at intervals. In this scenario, the tamper resistant device would generate the key and decode the received content from the source device 301.

The sink device 305 selects a second encryption or scrambling key 307. The sink device then encrypts the second encryption or scrambling key 307 using the public key 2 of the tamper resistant device 303. The encrypted second encryption or scrambling key 307 is then sent to the tamper resistant device 303 via the transmission link 304. The tamper resistant device 303 decrypts the second encryption or scrambling key 307 using the private key 2. The tamper resistant device 303 then encrypts the decrypted content from the source device 301 using the second encryption or scrambling key 307 and transmits the re-encrypted content to the sink device 305 via the transmission link 304.

Figure 4:
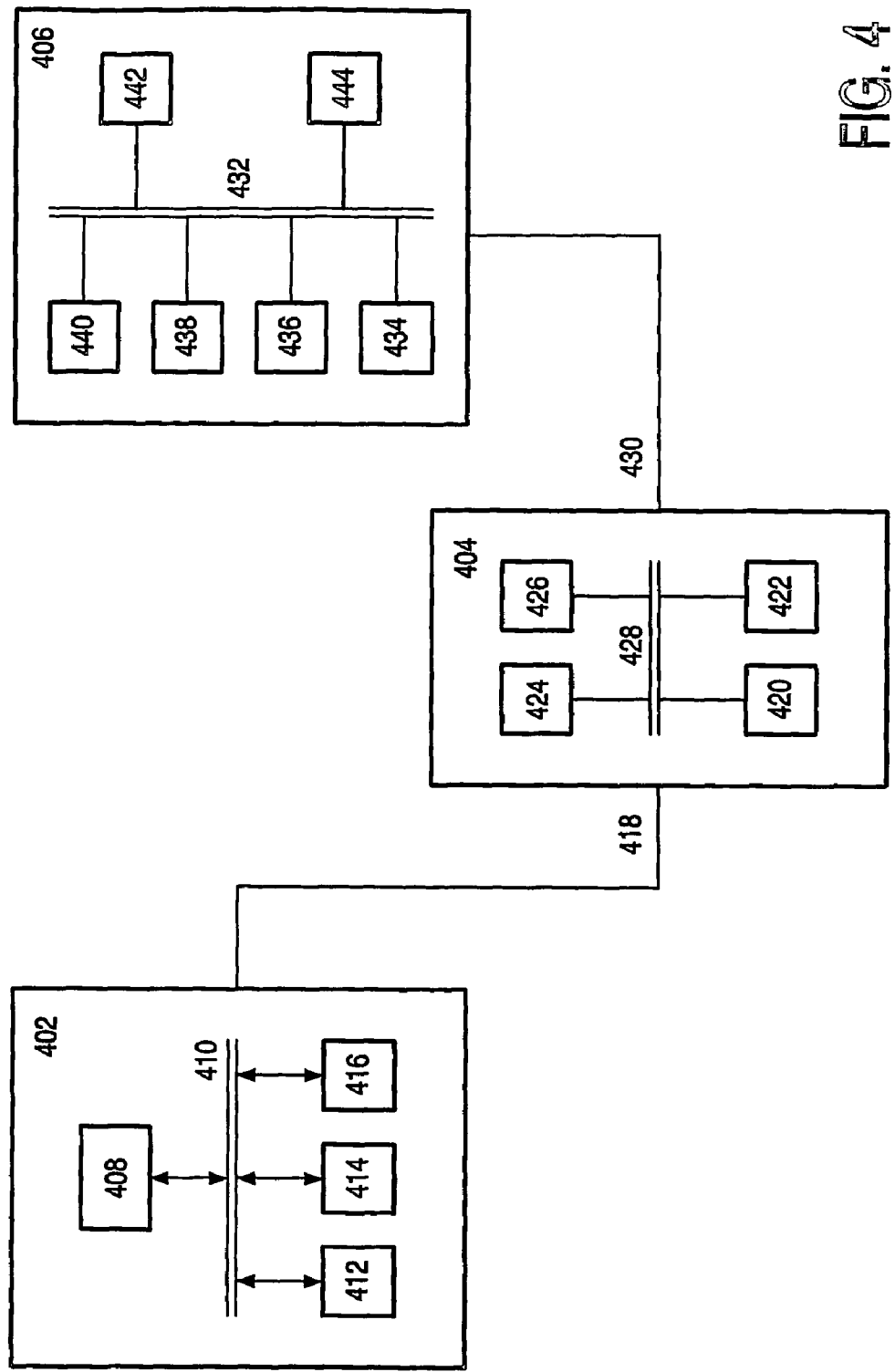
FIG. 4 is a block schematic representation of a transmission system for transmitting media content according to one embodiment of the invention.

The present invention will now be described in more detail with reference to FIG. 4. As shown, multimedia content is transmitted from a source device 402 to a sink device 406 for display. The source device 402 comprises, among other elements, a memory device 408, a bus 410, an encoder 412, an encryption device 414, and a processor 416 for controlling the operation of the source device 402. It will be understood that the source device may contain other elements and some of the listed elements may be combined in a single element. The stored multimedia content is first optionally encoded by the encoder 412. The (encoded) content is then encrypted by the encryption device 414 using a first encryption key. The first encryption key is then encrypted by the encryption device 414 using the public key of the tamper resistant device 404. The encrypted content and the encrypted first encryption key are then transmitted to the tamper resistant device 404 via the transmission link 418. As described above with respect to FIG. 3, the source device 301 and the tamper resistant device 303, in the alternative, can exchange key material during the authentication phase to enable each other to generate the same first encryption key. In this scenario, the source device 402 would generate the first encryption code and encrypt the content, wherein the content is sent to the tamper resistant device 404.

The tamper resistant device 404 comprises, among other elements, a decryption device 420, an encryption device 422, a memory device 424, a bus 428 and a processor 426 for controlling the operation of the tamper resistant device. The tamper resistant device first decrypts the first encryption key using its private key which is stored in memory 424. Once the encryption key has been decrypted by the decryption device 420, the decryption device 420 now uses the decrypted encryption key to decrypt the encrypted content received from the source device 402. In the alternative, the tamper resistant device 404 could generate the first encryption key and decrypt the encrypted content.

The sink device 406 comprises, among other elements, a bus 432, an encryption/decryption device 434, a decoder 436, a rendering device 438, an output device 440, a memory 442 and a processing unit 444 for controlling the operation of the sink device 406. The sink device 406 selects the second encryption key which will be used to protect the content transmitted over the transmission link 430 between the tamper resistant device 404 and the sink device 406. The encryption/decryption device 434 encrypts the second encryption key using the public key of the tamper resistant device 404 and transmits the encrypted encryption key to the tamper resistant device over the transmission link 430.

The decryption device 420 decrypts the encrypted second encryption key using the private key of the tamper resistant device 404. The encryption device can now encrypt the decrypted content from the source device 402 using the second encryption key. The re-encrypted content is then sent to the sink device 406 over the transmission link 430.

The sink device 406 uses the second encryption key to decrypt the encrypted content received from the tamper resistant device 404 using the encryption/decryption device 434. The decrypted content is then optionally decoded by the decoder 436. The decoded content is then handled further, for example it is rendered by the rendering device 120 and displayed on the output device 440.

The second encryption key may take many forms. For example, the second encryption key can be a scrambling key which is used to prime a pseudo-random number generator, for example in the encryption device 422, wherein the output of the pseudo-random generator is XOR'ed with the content in the clear in the tamper resistant device. The sink device 406 would then have to XOR the received data with the output of it's own pseudo-random number generator, for example in the encryption/decryption device 434, primed by the same second encryption key. It will be understood by one skilled in the art that any safe, stream cipher technique is also suitable for this operation and the invention is not limited thereto.

The second encryption key is ephemeral and is used only during the content transfer between the tamper resistant device 404 and the sink device 406. The tamper resistant device 404 enforces an application layer protection while the cryptographic facility added to the sink device 406 enforces a link layer protection. The method is designed such that the cryptographic capabilities expected from the sink device 406 are kept to a minimum.

It will be understood that the different embodiments of the invention are not limited to the exact order of the above-described steps as the timing of some steps can be interchanged without affecting the overall operation of the invention. Furthermore, the term "comprising" does not exclude other elements or steps, the terms "a" and "an" do not exclude a plurality and a single processor or other unit may fulfill the functions of several of the units or circuits recited in the claims.

The invention claimed is:

1. A method for providing secure communication between a tamper resistant device and a sink device, comprising the steps of:
   receiving encrypted content from a source device at the tamper resistant device, wherein said content has been encrypted using a first key;
   decrypting the content using the first key;
   encrypting a second key using the public key of the tamper resistant device;
   receiving the encrypted second key at the tamper resistant device from the sink device;
   decrypting the encrypted second key using the private key of the tamper resistant device;
   re-encrypting the decrypted content using said decrypted second key; and
   transmitting said re-encrypted content to said sink device.

2. The method according to claim 1, wherein the encrypted content is encoded.

3. The method according to claim 2, further comprising the steps of:
   decrypting the encrypted content using said second key in said sink device;
   decoding the decrypted content;
   displaying said content.

4. The method according to claim 1, wherein the tamper resistant device is a smart card or a dongle.

5. The method according to claim 1, wherein the decrypted second key is used to prime a first pseudo-random number generator and the output of the generator is XOR'ed with the decrypted data in the tamper resistant device.

6. The method according to claim 5, wherein the sink device XOR's the received encrypted content with an output of a second pseudo-random number generator primed by the second key.

7. The method according to claim 1, wherein said content is multimedia content.

8. The method according to claim 1, wherein the source device and the tamper resistant device each generate the same first key.

9. The method according to claim 1, wherein the first key is sent to the tamper resistant device.

10. The method according to claim 9, wherein the first key is encrypted using a public key of the tamper resistant device.

11. The method of claim 1, further including, prior to receiving the encrypted second key at the tamper resistant device, selecting the encrypted second key at the sink device.

12. An apparatus for providing secure communication between a tamper resistant device and a sink device, comprising:
   means for receiving encrypted content from a source device at the tamper resistant device, wherein said data has been encrypted using a first key;
   means for decrypting the content using the decrypted first key;
   means for receiving a second key at the tamper resistant device from the sink device, wherein the second key is encrypted using the public key of the tamper resistant device;
   means for decrypting the encrypted second key using the private key of the tamper resistant device;
   means for re-encrypting the content using said decrypted second key; and
   means for transmitting said re-encrypted content to said sink device.

13. The apparatus of claim 12, further including means for XORing at least one of the decrypted content or encrypted content with an output of a pseudo-random number generator.

14. A system for providing secure communication between a tamper resistant device and a sink device, comprising:
   a source device for transmitting encrypted content, wherein said content has been encrypted using a first key;
   the tamper resistant device receiving encrypted content from the source device,
   the tamper resistant device decrypting the content using the first key;
   the tamper resistant device further receiving an encrypted second key from the sink device, wherein the encrypted second key is encrypted at the sink device using the public key of the tamper resistant device;
   the tamper resistant device decrypting the encrypted second key using the private key of the tamper resistant device;
   the tamper resistant device re-encrypting the content using said decrypted-second key; and
   the tamper resistant device transmitting said re-encrypted content to said sink device.

15. The system of claim 14, wherein the encrypted second key is selected at the sink device prior to encrypting the second key at the sink device.

16. The system of claim 14, wherein the encrypted second key is sent from the sink device and received by the tamper resistant device prior to decrypting and using the encrypted second key to re-encrypt the decrypted content.

17. The system of claim 14, further including a pseudo-random number generator, wherein an output of the pseudo-random number generator is XOR'ed with the decrypted content.

18. The system of claim 14, further including a pseudo-random number generator, wherein an output of the pseudo-random number generator is XOR'ed with the encrypted content.

* * * * *